(12) United States Patent
Speidel

(10) Patent No.: US 10,458,581 B2
(45) Date of Patent: Oct. 29, 2019

(54) CRIMPED VAPOR RECOVERY HOSE FITTING

(71) Applicant: ContiTech USA, Inc., Fairlawn, OH (US)

(72) Inventor: Andrew J. Speidel, Norfolk, NE (US)

(73) Assignee: ContiTech USA, Inc., Fairlawn, OH (US)

( * ) Notice: Subject to any disclaimer, the term of this patent is extended or adjusted under 35 U.S.C. 154(b) by 281 days.

(21) Appl. No.: 15/609,329

(22) Filed: May 31, 2017

(65) Prior Publication Data

US 2018/0347737 A1    Dec. 6, 2018

(51) Int. Cl.
*F16L 11/20*    (2006.01)
*F16L 33/207*    (2006.01)

(52) U.S. Cl.
CPC ................ *F16L 33/2076* (2013.01)

(58) Field of Classification Search
CPC ... F16L 27/08; F16L 27/0808; F16L 33/2076; F16L 33/2073; F16L 39/04; F16L 39/06; F16L 25/01; F16L 11/20
USPC ........ 285/121.6, 272, 276, 275, 351, 123.15
See application file for complete search history.

(56) References Cited

U.S. PATENT DOCUMENTS

| | | | | |
|---|---|---|---|---|
| 3,367,681 A | * | 2/1968 | Braukman | F16L 27/0816 285/148.13 |
| 3,402,253 A | * | 9/1968 | McCracken | F16L 25/01 174/86 |
| 5,735,553 A | * | 4/1998 | Niemiec | F16L 19/0212 285/101 |
| 6,123,123 A | * | 9/2000 | Carder, Sr. | B67D 7/32 137/68.15 |
| 6,485,064 B1 | * | 11/2002 | Davidson | F16L 33/2071 285/353 |
| 6,491,325 B1 | * | 12/2002 | Boche | F16L 27/0816 285/256 |
| 6,494,233 B2 | * | 12/2002 | Seghi | F16L 27/0816 138/109 |
| 7,014,218 B2 | | 3/2006 | Fisher et al. | |
| 7,063,357 B1 | * | 6/2006 | Bay | F16L 13/147 285/246 |
| 7,267,374 B2 | | 9/2007 | Nielson | |
| 8,820,797 B2 | | 9/2014 | Brill | |
| 2006/0108798 A1 | | 5/2006 | Goodridge | |
| 2009/0295154 A1 | | 12/2009 | Weil et al. | |
| 2014/0345112 A1 | | 11/2014 | Brill | |
| 2018/0135787 A1 | * | 5/2018 | Badhorn | F16L 27/0812 |

FOREIGN PATENT DOCUMENTS

WO    2016/100558 A1    6/2016

* cited by examiner

*Primary Examiner* — Aaron M Dunwoody
(74) *Attorney, Agent, or Firm* — David Cate

(57) ABSTRACT

A hose fitting includes a stem defining a conduit therein, a ridged axial portion, an opposing axial portion and a stem shoulder. The fitting also includes a swivel nut having threads and wrench flats, where the swivel nut defines a swivel nut end adjacent the threads, and the swivel nut is disposed on the opposing axial portion of the stem. The fitting also has a metallic wave spring washer disposed upon the stem between the stem shoulder and the swivel nut end, and a ferrule for securing a hose to the hose fitting at the ridged axial portion of the stem. In some cases, an inner fitting is disposed in the conduit at the opposing axial portion of the stem, and an inner hose may be in the conduit and attached to the inner fitting.

16 Claims, 3 Drawing Sheets

CRIMPED VAPOR RECOVERY HOSE FITTING

FIELD

The present disclosure relates generally to hose fittings, and more particularly to swivel fittings permanently affixed to fuel hoses having vapor recovery lines therein.

BACKGROUND

This section provides background information to facilitate a better understanding of the various aspects of the disclosure. It should be understood that the statements in this section of this document are to be read in this light, and not as admissions of prior art.

Hose fittings, and in particular, swivel fittings, are known and have been in use for many years. Such fittings are attached to the end of a hose for the further conduit of a liquid or gas. Conventional swivel fittings used on gasoline hoses are reattachable, permitting the removal of the gasoline nozzle or hose and reinstallation and attachment of different swivel nuts and various attachments in the field by any technician or layperson.

Prior art swivel fittings function with a swivel nut secured to a stem piece by means of a retaining ring. The partial assembled fitting, with the retaining ring and swivel nut at the opposing end, is inserted into a hose, over which a ferrule has already been provided. The ferrule is secured to the stem, connecting the hose with the swivel fitting. By design, the conventional retaining ring is removable and the swivel nut can be removed and reinstalled in the field which may lead to safety concerns if the fitting is not reinstalled correctly. In practice, the retaining ring frequently becomes damaged and can come off while in service, resulting in a serious safety problem. Furthermore, such swivel fittings are not suitable for vapor recovery hose assemblies.

Typical vapor recovery fittings are made of high cost materials such as brass and are attached to the hose via internal expansion process. Such vapor recovery fittings also require an additional retaining ring to hold the swivel nut in place. Furthermore, some vapor recovery fittings can have higher electrical resistance levels than desired.

Thus, there is an ongoing need for improved vapor recovery hose fittings made of lower cost material, while maintaining current performance standards, as well as having improved electrical resistance properties, such need met at least in part with embodiments according to the following disclosure.

SUMMARY

This section provides a general summary of the disclosure, and is not a necessarily a comprehensive disclosure of its full scope or all of its features.

In some aspects of the disclosure, a hose fitting includes a stem defining a conduit therein, a ridged axial portion, an opposing axial portion and a stem shoulder. The fitting also includes a swivel nut having threads and wrench flats, where the swivel nut defines a swivel nut end adjacent the threads, and the swivel nut is disposed on the opposing axial portion of the stem. The fitting also has a metallic wave spring washer disposed upon the stem between the stem shoulder and the swivel nut end, and a ferrule for securing a hose to the hose fitting at the ridged axial portion of the stem. In some cases, an inner fitting is disposed in the conduit at the opposing axial portion of the stem, and an inner hose may be disposed in the conduit and attached to the inner fitting.

The stem may further include at least one groove for placement of at least one o-ring, and the swivel nut may further have a groove for placement of an o-ring. The ridged axial portion of the stem and the ferrule may have barbs. The ferrule may also have a ferrule shoulder, and the stem may have a corresponding shoulder and groove for securing the ferrule shoulder when crimped on the stem.

In some cases, the stem and the swivel nut are made of zinc alloy, and the ferrule made of unplated aluminum. Also, the metallic wave spring washer may be made of copper alloy.

In another aspect of the disclosure, a hose fitting includes a stem defining a conduit therein, a ridged axial portion, an opposing axial portion and a stem shoulder. The fitting also includes a swivel nut having threads and wrench flats, where the swivel nut defines a swivel nut end adjacent the threads, and the swivel nut is disposed on the opposing axial portion of the stem. The fitting also has a metallic wave spring washer disposed upon the stem between the stem shoulder and the swivel nut end, a ferrule for securing a hose to the hose fitting at the ridged axial portion of the stem, and an inner fitting disposed in the conduit at the opposing axial end, for connection to an inner hose of a fuel vapor recovery hose. The stem and the swivel nut are made of zinc alloy, the ferrule made of unplated aluminum, and the metallic wave spring washer made of copper alloy. In some cases, the copper alloy is a beryllium copper alloy.

In yet other aspects of the disclosure, an assembly includes a fuel hose having a first terminal end and a second terminal end, and the fuel hose defines an outer wall and inner wall. The assembly further includes a first hose fitting including a stem defining a conduit therein, a ridged axial portion, an opposing axial portion and a stem shoulder. The fitting also includes a swivel nut having threads, where the swivel nut defines a swivel nut end adjacent the threads, and the swivel nut is disposed on the opposing axial portion of the stem. The fitting also has a metallic wave spring washer disposed upon the stem between the stem shoulder and the swivel nut end, a ferrule for securing the fuel hose to the hose fitting at the ridged axial portion of the stem. The inner wall of the first terminal end is disposed on the ridged axial portion of the stem, and the ferrule is disposed upon the outer wall at the first terminal end. The ferrule is crimped onto the fuel hose and rigid axial portion of the stem.

In some cases, the assembly further includes an inner fitting disposed in the conduit at the opposing axial portion of the stem. An inner hose disposed within the fuel hose, extending through the conduit, may be attached to the inner fitting.

A second hose fitting may be attached to the second terminal end fuel hose, and the second hose fitting may be equivalent in construction to the first hose fitting. Furthermore, the first hose fitting may be attached to a fuel dispensing nozzle via the threads on the swivel nut of the first hose fitting, and the second hose fitting may be attached to a fuel dispensing fitting via the threads on the swivel nut of the second hose fitting.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described

DETAILED DESCRIPTION

Figure 1:
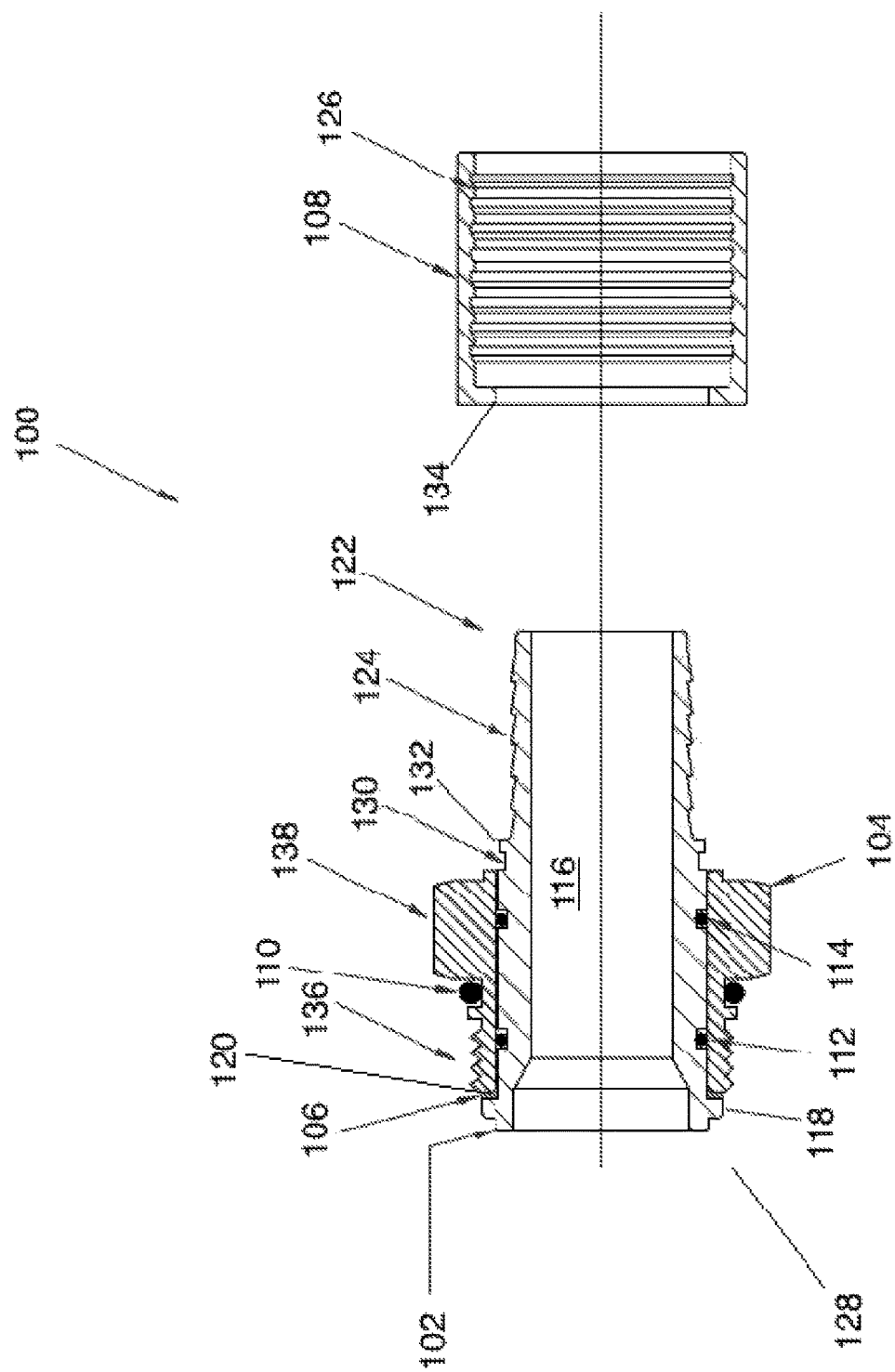
FIG. 1 illustrates an embodiment of a hose fitting components in a cross-sectional view, in accordance with the disclosure.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

According to some aspects of the disclosure, hose fittings are swivel or non-swivel fittings for fuel vapor recovery hose assemblies that are attached via a crimping process or an internal expansion process, in contrast to typical vapor recovery fittings, which are made of higher cost materials such as brass. Embodiments of the disclosure utilize lower cost materials, such as zinc and/or aluminum materials, and are attached by a crimping process or an internal expansion process. In some aspects, a copper wave ring is disposed between the swivel fitting components to lower the electrical resistance through the fitting. Furthermore, the fittings use a stem/hose ridged or barb structure which holds the wave ring and swivel nut in place without the need for an additional retaining ring.

Figure 2:
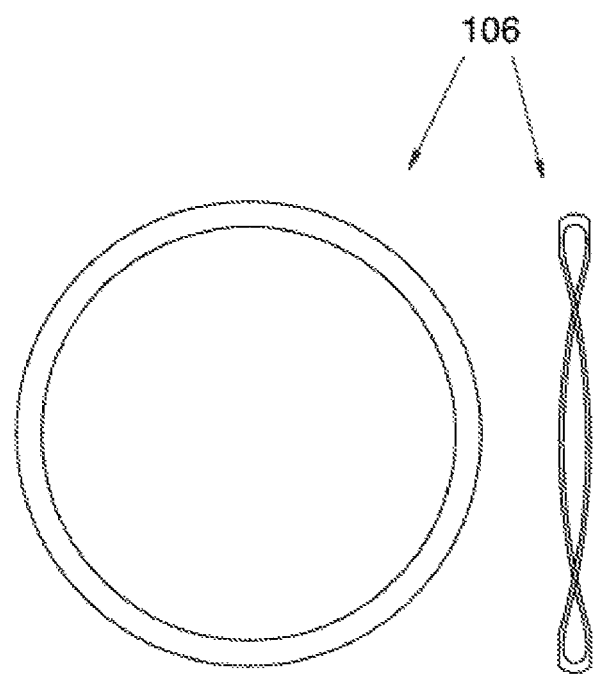
FIG. 2 depicts a metallic wave spring washer useful in fittings according to the disclosure, in both front and side views; and, FIG. 3 illustrates an embodiment of an assembly including a hose and hose fitting, in a cross-sectional/partial cut away view, in accordance with the disclosure.

Now referencing FIG. 1, which shows a fitting 100 for use with a fuel hose, in accordance with some embodiments of the disclosure. The fitting 100 generally includes, at least such separate components as stem 102, swivel nut 104, metallic wave spring washer 106 disposed between stem 102 and swivel nut 104, ferrule 108, and o-rings 110, 112 and 114. Stem 102 defines an axial conduit 116 through which fuel may pass through as well as accommodating an optional vapor recovery line and fitting, as shown in great detail below. Stem 102 also includes shoulder 118, and swivel nut 104 includes end 120, between which metallic wave spring washer 106 is disposed. Metallic wave spring washer 106 provides both a locking function and electrical conductivity between stem 102 and swivel nut 104, thus avoiding any electrical charge from undesirably accumulating in 102, swivel nut 104, or both. Metallic wave spring washer 106 may be made of any suitable metal, or metal alloy, to achieve such properties, including copper, copper alloy, and in one aspect, a beryllium copper alloy, such as, but not limited to, 172 beryllium copper alloy. FIG. 2 depicts metallic wave spring washer 106 in front and side views.

Referring again to FIG. 1, ferrule 108 is crimped onto and around an outer cover of a fuel hose, after the fuel hose is placed over axial portion 122 of stem 102. Portion 122 of stem 102 includes ridges, barbs, or otherwise raised features 124 (5 shown) for sealing with and retaining an inner wall of the fuel hose. Correspondingly, ferrule 108 includes ridges, barbs or otherwise raised features 126 (7 shown) for sealing with and retaining an outer wall of the cover of the fuel hose, once crimped thereupon.

The opposing axial portion, 128, of stem 102 is provided with a plurality of grooves for placement of o-rings 112, 114 to provide a gasoline impervious seal with the swivel nut 104. The swivel nut 104 is slid onto the stem 102. The stem 102 is insertable into a fuel hose which may be provided with a ferrule 108. As indicated above, the outer circumference of the ferrule 108 has a surface for crimping ferrule 108 onto a fuel hose and stem 102. Additionally, the outer circumference of the stem 102 includes a groove 130 and shoulder 132. The shoulder 132 is of a diameter less than the diameter of the internal shoulder 134 on ferrule 108, so that the ferrule shoulder 134 passes over shoulder 132 and sets in groove 130, when crimped.

Referring again to swivel nut 104, which further includes threads 136 and a groove for placement of o-ring 110. O-ring 110 also provides a gasoline impervious seal with swivel nut 104, and equipment that fitting 100 is attached to via threads 136, such as a fuel dispensing nozzle, fitting or pump. Swivel nut 104 also includes wrench flats 138 for securing the fitting to the equipment.

Figure 3:
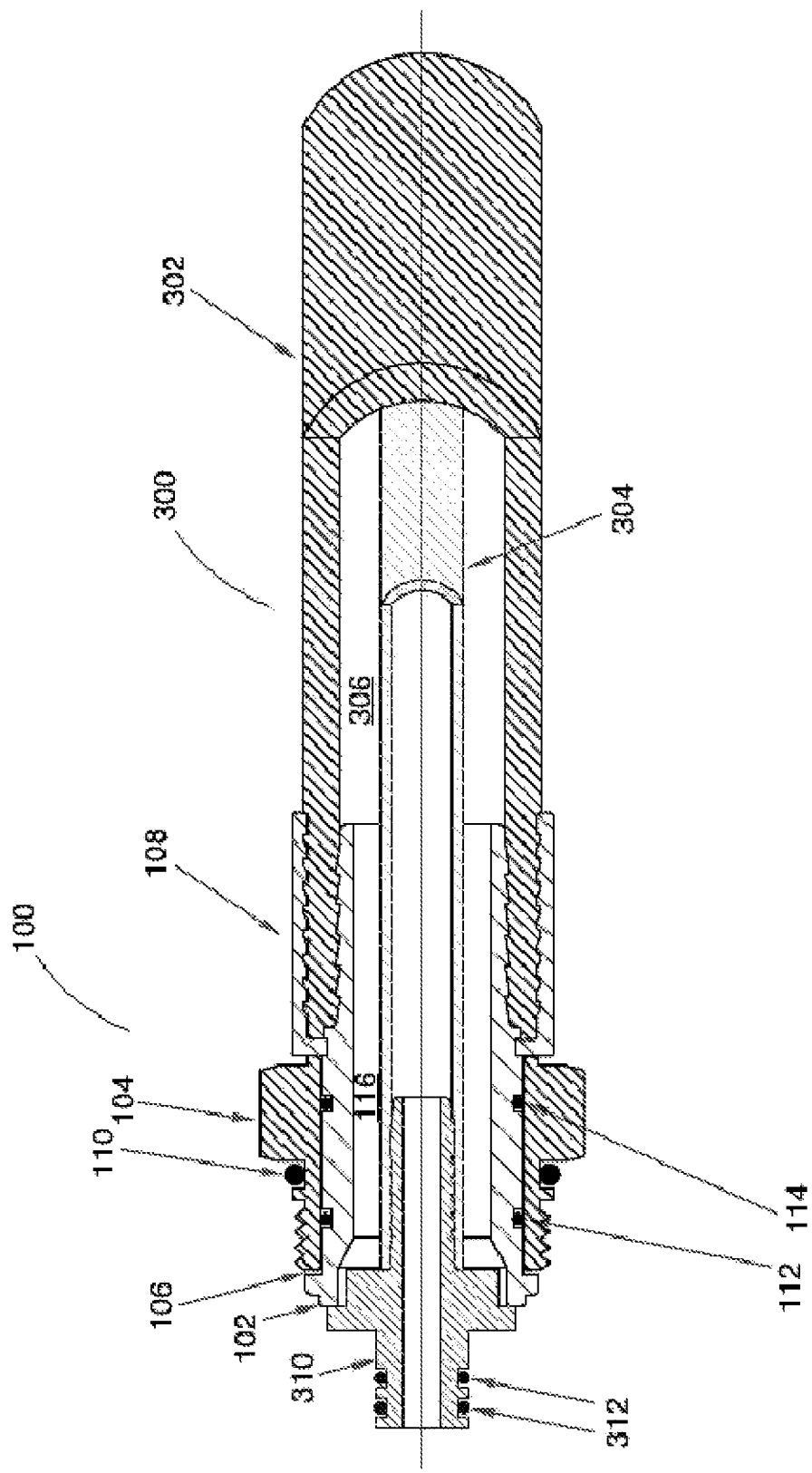

Now referencing FIG. 3, which shows a system having fitting 100 incorporated with a fuel vapor recovery hose, and an inner fitting. As described above, the fitting 100 includes such features as stem 102, swivel nut 104, metallic wave spring washer 106, ferrule 108, and o-rings 110, 112 and 114. Fuel vapor recovery hose 300 is shown and includes outer hose 302 and inner hose, or otherwise tubing, 304 utilized for fuel vapor recovery. Fuel vapor recovery hose 300 may be of any suitable construction or design, including, but not limited to, those hoses disclosed in PCT Pub. App. No. WO2016/100558, which is incorporated herein in its entirety, by reference thereto. The system further includes inner fitting 310, having grooves to accept o-rings 312, and which is disposed in a distal end of conduit 116 defined within stem 102.

When assembled, the system depicted in FIG. 3 has outer hose 302 sealingly connected to stem 102 and ferrule 108, as described above. Inner hose 304, contained within and extending from outer hose 302, passes through conduit 116 of stem 102. The inner wall of inner hose 304 is sealingly mated upon and with inner fitting 310, through both of which, fuel vapors pass and are recovered during a fueling operation. In the annular space (annulus) 306 formed between outer hose 302 and inner hose 304, fuel passes through, either from, or toward, conduit 116. Further, inner fitting 310 includes suitable ports for enabling the fuel to pass therethrough, as well.

In providing a hose 300 with a crimped on swivel fitting 100 in accordance with some aspects of the disclosure, the following steps may be employed. The swivel nut 104 is slid over the ridged axial portion 122, or barbed end, of the stem 102, with the threads 136 directed towards the axially shoulder 118 of the stem 102. The swivel nut 104 is pushed over the o-rings 112, 114 until the swivel nut 104 meets metallic wave spring washer 106. The ferrule 108 is placed over the end of the hose 300 with the internal shoulder 134 of ferrule 108 placed at the terminal end of the hose 300. The ridged axial portion 122 of the stem 102 (with the attached swivel nut 104 disposed at the opposing axial portion 128) is then inserted into the hose 300. After placement of the stem 102 into the hose 300, the ferrule shoulder 134 is positioned at groove 130 of the stem 102 and sets in groove 130, upon crimping, and slides adjacent shoulder 132. The crimping of the ferrule 108 may result in slight deformation of the smooth circular configuration of the outer circumference of the ferrule. After crimping, the swivel nut 104 is secured onto the stem 102 between the stem shoulder 118 and the ferrule 108. Following crimping, without a complete removal of the crimped-on ferrule 108, the swivel nut 102 cannot be removed from the stem 104.

Following crimping, fuel dispensing fittings and nozzles may be attached to the swivel nut 104. The secure attachment of the swivel nut 104 permits a fuel nozzle to rotate 360° around the hose without causing the hose to kink or tangle. Additionally, the fitting 100 can be designed to install on all sizes of gasoline hose. The method of locking the swivel nut 104 onto the stem 102 without the use of a retaining ring can also be used on many other types of known and conventional hoses.

The stem 102, swivel nut 104, and ferrule 108 of this fitting can be made out of various known and conventional materials either plated or unplated, such as brass, zinc, aluminum, and steel. The selection of the particular material for each component of the fitting may be based upon the desired use of the assembly. In some embodiments, the stem 102 is made of zinc alloy and may have optional nickel plating, the swivel nut 104 is unplated and made of zinc alloy, and the ferrule 108 is unplated aluminum.

Some assemblies according to the disclosure have several advantages over conventional crimped-on swivel fittings. The crimped-on swivel assembly does not permit removal and reinstallation of the swivel nut 102, removing any safety concerns due to damage to conventional retaining rings. The crimped-on assembly has better fitting retention than conventional crimped-on swivel fittings. The crimp-on assembly also has higher coupling tensile and better flex life. The assembly is also lower in cost and safer to assemble and use. Also, use of a copper wave ring disposed between the swivel fitting stem and swivel nut lowers the electrical resistance through the fitting, thus providing electrical conductivity through the fitting and reduced or eliminate static electricity charge build up. Further, while a crimped ferrule connection is described above, in some other embodiments, an internal expansion connection may be used, as opposed to crimped connection.

Embodiments according to the disclosure may also include such features as disclosed in U.S. Pat. No. 6,491,325, the disclosure of which is incorporated herein, by reference, in its entirety.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, and gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE SIGNS (PART OF THE DESCRIPTION)

100 Hose Fitting
102 Stem
104 Swivel Nut
106 Metallic Wave Spring Washer
108 Ferrule
110,112,114 O-rings
116 Conduit of Stem 102
118 Stem Shoulder
120 Swivel Nut End
122 Ridged Axial Portion
124 Stem Ridges, Barbs, or Raised Features
126 Ferrule Ridges, Barbs, or Raised Features
128 Opposing Axial Portion
130 Stem Groove
132 Stem Shoulder
134 Ferrule Shoulder
136 Swivel Nut Threads
138 Swivel Nut Wrench Flats
300 Fuel Vapor Recovery Hose
302 Outer Hose
304 Inner Hose
306 Annulus
310 Inner Fitting
312 O-rings

What is claimed is:

1. A hose fitting comprising:
a stem defining a conduit therein, a ridged axial portion, an opposing axial portion and a stem shoulder;
a swivel nut comprising threads and wrench flats, wherein the swivel nut defines a swivel nut end adjacent the threads, and wherein the swivel nut is disposed on the opposing axial portion of the stem;
a metallic wave spring washer disposed upon the stem between the stem shoulder and the swivel nut end;
a ferrule for securing a hose to the hose fitting at the ridged axial portion of the stem;
an inner fitting disposed in the conduit at the opposing axial portion of the stem; and,
an inner hose disposed in the conduit and attached to the inner fitting, through which fuel vapors pass and are recovered.

2. The hose fitting according to claim 1, wherein the stem further comprises at least one groove for placement of at least one o-ring.

3. The hose fitting according to claim 1, wherein the swivel nut further comprises a groove for placement of an o-ring.

4. The hose fitting according to claim 1, wherein the ridged axial portion comprises barbs and wherein the ferrule comprises barbs.

5. The hose fitting according to claim 1, wherein the ferrule comprises a ferrule shoulder, wherein the stem comprises a shoulder and a groove, and wherein the ferrule shoulder is secured by the groove and the shoulder of the stem when crimped thereon.

6. The hose fitting according to claim 1, wherein the stem and the swivel nut comprise zinc alloy, and wherein the ferrule comprises unplated aluminum.

7. The hose fitting according to claim 1, wherein the metallic wave spring washer comprises copper alloy.

8. An assembly comprising:
a fuel hose having a first terminal end and a second terminal end, and defining an outer wall and inner wall; and,
a first hose fitting comprising:
 i. a stem defining a conduit therein, a ridged axial portion, an opposing axial portion and a stem shoulder;
 ii. a swivel nut comprising threads, wherein the swivel nut defines a swivel nut end adjacent the threads, and wherein the swivel nut is disposed on the opposing axial portion of the stem;
 iii. a metallic wave spring washer disposed upon the stem between the stem shoulder and the swivel nut end; and,
 iv. a ferrule for securing the fuel hose, at the first terminal end, to the hose fitting at the ridged axial portion of the stem;
an inner fitting disposed in the conduit at the opposing axial portion of the stem; and,
an inner hose disposed in the conduit and attached to the inner fitting, through which fuel vapors pass and are recovered;
wherein the inner wall of the first terminal end is disposed on the ridged axial portion of the stem, wherein the ferrule is disposed upon the outer wall at the first terminal end, and wherein the ferrule is crimped onto the fuel hose and rigid axial portion of the stem.

9. The assembly according to claim 8, wherein the stem further comprises at least one groove having a first o-ring disposed therein, and wherein the swivel nut further comprises a groove having a second o-ring disposed therein.

10. The assembly according to claim 8, wherein the ferrule comprises a ferrule shoulder, wherein the stem comprises a shoulder and a groove, and wherein the ferrule shoulder is secured by the groove and the shoulder of the stem.

11. The assembly according to claim 8, wherein a second hose fitting is attached to the second terminal end fuel hose, and wherein the second hose fitting is equivalent in construction to the first hose fitting.

12. The assembly according to claim 11, wherein the first hose fitting is attached to a fuel dispensing nozzle via the threads on the swivel nut of the first hose fitting, and wherein the second hose fitting is attached to a fuel dispensing fitting via the threads on the swivel nut of the second hose fitting.

13. The assembly according to claim 8, wherein the stem and the swivel nut comprise zinc alloy, and wherein the ferrule comprises unplated aluminum.

14. The assembly according to claim 8, wherein the metallic wave spring washer comprises copper alloy.

15. A hose fitting comprising:
a stem defining a conduit therein, a ridged axial portion, an opposing axial portion and a stem shoulder;
a swivel nut comprising threads and wrench flats, wherein the swivel nut defines a swivel nut end adjacent the threads, and wherein the swivel nut is disposed on the opposing axial portion of the stem;

a metallic wave spring washer disposed upon the stem between the stem shoulder and the swivel nut end;

a ferrule for securing a hose to the hose fitting at the ridged axial portion of the stem; and, an inner fitting disposed in the conduit at the opposing axial end, for connection to an inner hose of a fuel vapor recovery hose;

wherein the stem and the swivel nut comprise zinc alloy, wherein the stem is nickel plated, wherein the ferrule comprises unplated aluminum, and wherein the metallic wave spring washer comprises copper alloy.

16. The hose fitting according to claim 15, wherein the metallic wave spring washer comprises a beryllium copper alloy.

* * * * *